Figure 1:
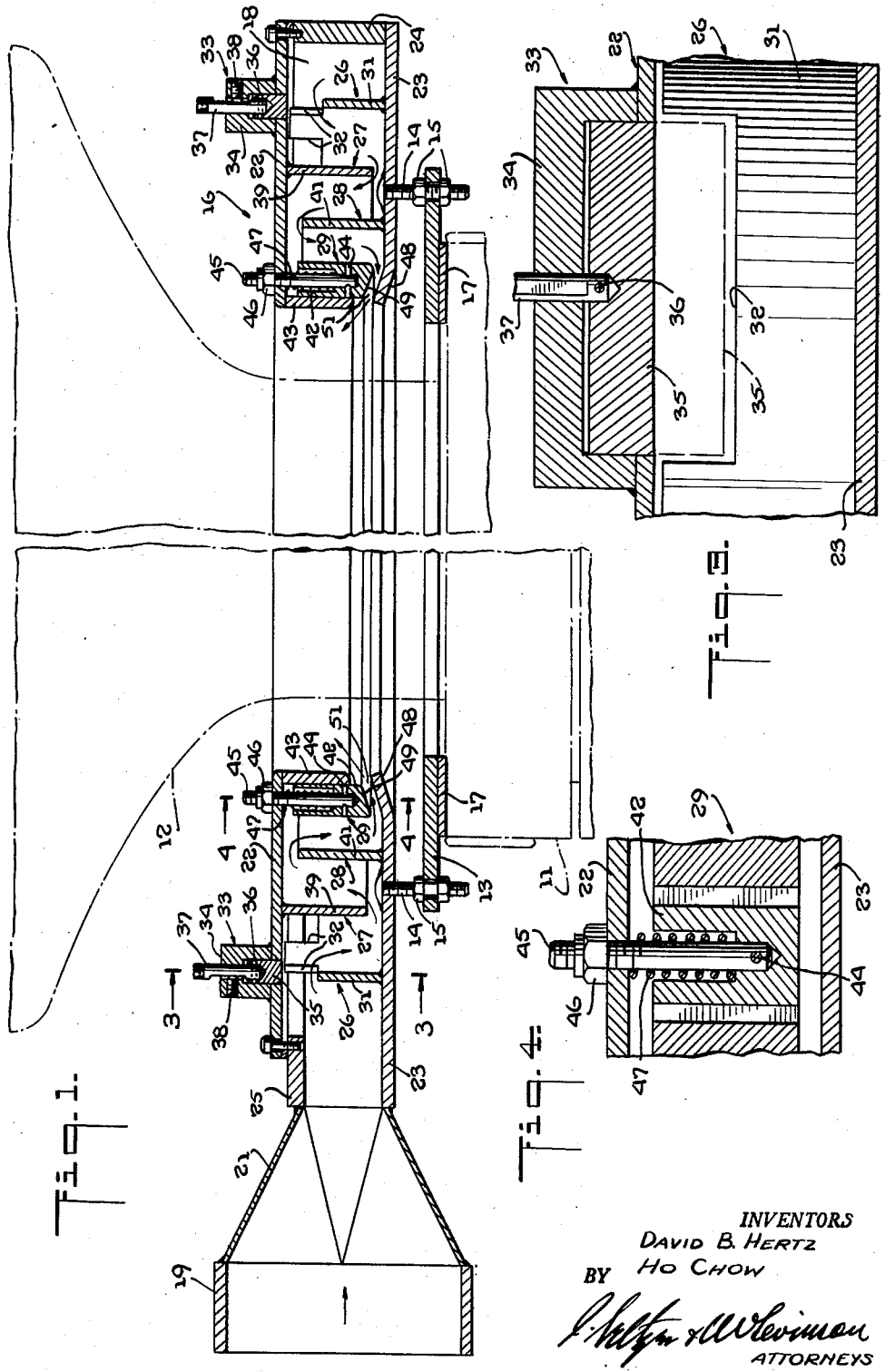

March 1, 1960

D. B. HERTZ ET AL 2,926,384

DISTRIBUTOR RING

Filed Oct. 20, 1953

2 Sheets-Sheet 2

INVENTORS
DAVID B. HERTZ
BY Ho CHOW

ATTORNEYS

United States Patent Office 2,926,384
Patented Mar. 1, 1960

2,926,384

DISTRIBUTOR RING

David B. Hertz and Ho Chow, New York, N.Y., assignors to Celanese Corporation of America, New York, N.Y., a corporation of Delaware Application October 20, 1953, Serial No. 387,171

8 Claims. (Cl. 18—14)

This invention relates to a distributor ring and relates more particularly to a distributor ring for obtaining a controlled flow of a fluid internally of the periphery of a circle and to an extrusion process and apparatus in which said distributor ring is employed.

In the extrusion of thermoplastic articles such as tubing, rods and the like it is frequently desirable to impinge a stream of cooling fluid on the material leaving the extrusion die to regulate its speed of cooling and thereby control the properties of the final product. To obtain a product having substantially uniform properties it is normally important that the stream of fluid impinging on the material leaving the extrusion die have a uniform flow at all points around the periphery of the extruded material. If the flow of the fluid is not uniform it will cause irregular cooling of the extruded material and this will result in irregularities in the properties of the products obtained. In other cases, it may be desirable to have different amounts of fluid impinging on different portions of the extruded material so as to provide a product whose properties vary around its periphery. It may also be desirable, in some cases, to have different amounts of fluid impinging on different portions of the extruded material to compensate for irregularities in the wall thickness or other properties of the material leaving the extrusion die and thereby obtain a final product of substantially uniform properties. Thus, if in extruding a tubing a certain portion of the tubing wall has a thickness greater than other portions of the tubing wall, a smaller stream of fluid should be impinged against said portion of greater thickness. Similarly a larger stream of fluid should be impinged against a portion of tubing whose wall has a lesser thickness than other portions of the tubing wall.

It is an important object of this invention to provide a distributor ring which will give a controlled flow of a fluid internally of the periphery of a circle whereby the said fluid may be caused to impinge on an extruded material passing through said distributor ring and effect the cooling thereof.

Another object of this invention is to provide an extrusion apparatus in which said distributor ring is employed.

A further object of this inventon is to provide a distributor ring which will be especially simple in construction and efficient in operation.

Other objects of this invention will be apparent from the following detailed description and claims.

According to the present invention, there is provided a distributor ring comprising an annular chamber through the open center of which the extruded thermoplastic articles pass as they emerge from the extrusion die. A cooling fluid in introduced into said annular chamber from one or more conduits and flows through said distributor ring to impinge on the extruded articles. To control the flow of cooling fluid to the extruded articles there are provided in said annular chamber a plurality of baffles, at least one of which is adjustable to regulate the flow of fluid flowing past the same.

In one embodiment of this invention, the baffles comprise a series of concentric ring-like members positioned so that they alternately extend upwardly from the base of the annular chamber and downwardly from the top of the annular chamber whereby the cooling fluid is forced to flow over and under said baffles in succession thereby tending to equalize the flow of cooling fluid through said annular chamber. The chambers formed by each pair of baffles are made relatively large as compared to the flow of the cooling fluid. For example, at least one, and preferably all, of said chambers are constructed so that the distance between the baffles is equal to at least 4 times the width of the opening at the entering baffle to said chamber. As a result, said chambers act like pressure reservoirs, tending to equalize the pressure of the fluid throughout the entire volume of said chambers and thereby tend to equalize the flow of cooling fluid through said chambers. Further to equalize or control the flow of cooling fluid through the annular chamber, the first of said baffles is provided with adjustable means such as gates or the like spaced around its periphery, which gates may be set to impose any desired degree of resistance to the flow of the cooling fluid therethrough and thereby equalize or control such flow. In addition, the innermost baffle is preferably constructed of a series of adjustable members, such as interfitting slidable blocks, to effect a close regulation of the flow of the cooling fluid immediately before it emerges from the annular chamber and strikes the extruded article. In this way there may be obtained any desired pattern of flow of the cooling fluid against the extruded article.

A preferred embodiment of this invention is shown in the accompanying drawings wherein Fig. 1 is a cross-sectional view of the distributor ring as applied to an extrusion apparatus.

Figure 2:
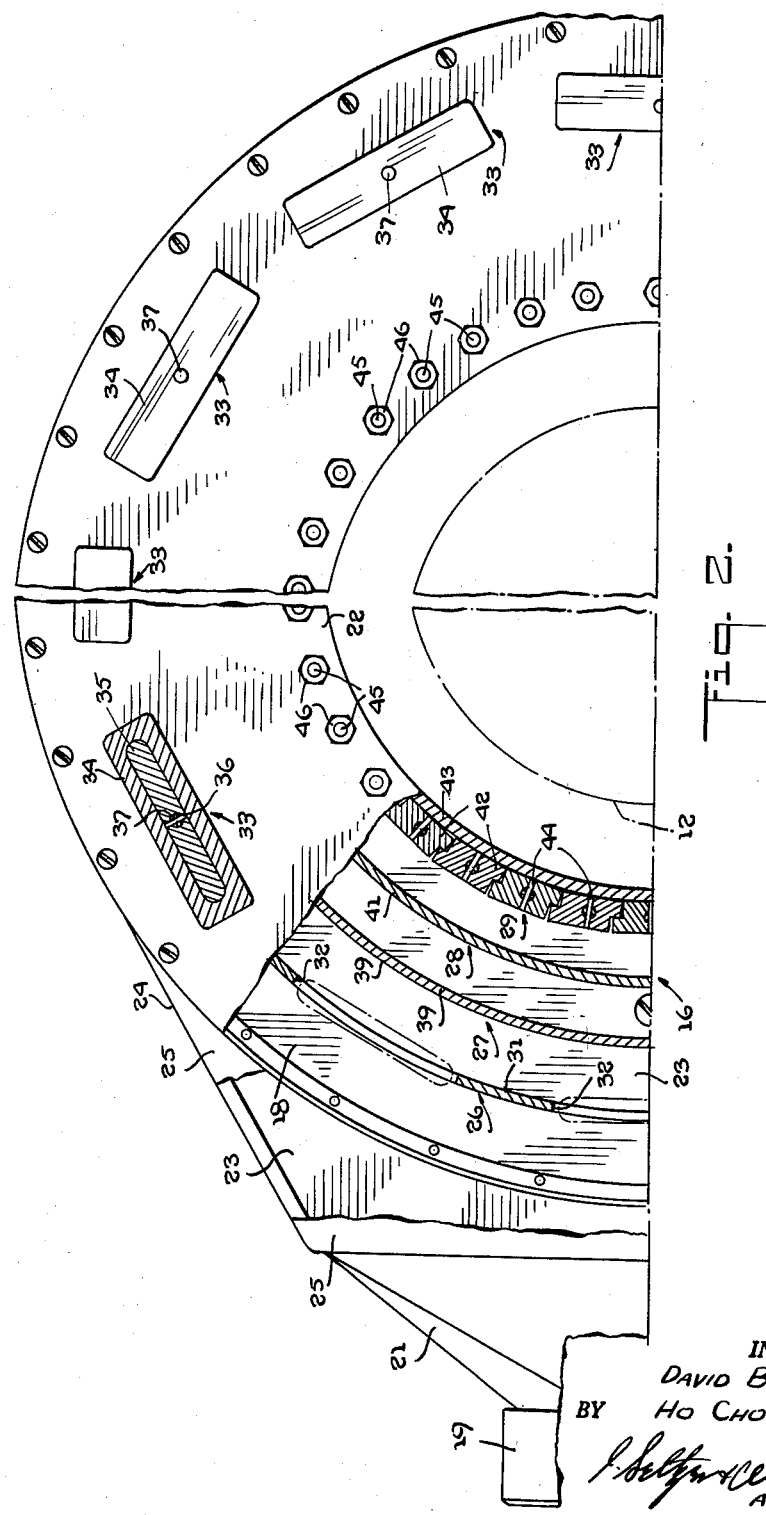

Fig. 2 is a plan view, partly broken away, of a portion of the distributor ring shown in Fig. 1, Fig. 3 is a cross-sectional view of one of the baffles, taken along the line 3—3 in Fig. 1 in the direction of the arrows, and Fig. 4 is a cross-sectional view of another of the baffles, taken along the line 4—4 in Fig. 1 in the direction of the arrows.

Referring now to the drawings, the reference numeral 11 designates the outlet end of a conventional extruder from which emerges an extruded tubing 12 which is caused to expand as it leaves the extruder 11 in a manner known in the art. Fastened to the front end of the extruder is a plate 13 to which is secured by means of studs 14 and nuts 15, a distributor ring, indicated generally by reference numeral 16, which directs a stream of cooling fluid such as air against the outer periphery of the tubing 12. The studs 14 and nuts 15 permit the spacing between the extruder 11 and the distributor ring 16 to be varied whereby the position at which the stream of air impinges against the tubing 12 may be adjusted as desired. A layer of thermal insulating material 17 is positioned between the extruder 11 and the plate 13 to minimize the conduction of heat from said extruder to the distributor ring 16 to avoid heating the air flowing therethrough.

The distributor ring 16 comprises an annular chamber 18 into which a stream of fluid, such as air, is introduced from a conduit 19 through a connecting conduit 21. The annular chamber 18 is formed by an upper annular plate 22 and a lower generally annular plate 23, which plates are joined to the upper and lower edges, respectively of a strip 24 which extends around the major portion of the periphery of the annular chamber 18 and whose ends extend to the end of the connecting conduit 21. To close the space between the annular plate 22 and the connecting conduit 21, there is provided a plate 25 shaped to fit said space. The lower generally annular plate 23 is so contoured that it extends to the connecting conduit 21.

The flow of the air entering the annular chamber 18 from the conduits 19 and 21 is controlled by means of four baffle members, indicated generally by reference numerals 26, 27, 28 and 29. The baffle member 26 comprises a ring-like member 31 extending from the lower plate 23 to the upper plate 22 and is provided, along its upper edge, with a plurality of ports 32 extending therethrough. To equalize the flow of air through the ports 32 and prevent the major portion of the air from flowing through those ports next adjacent the connecting conduit 21, the said ports are each provided with an adjustable gate, indicated generally by reference numeral 33. The adjustable gates 33 each comprises a block 34 secured to the upper surface of the plate 22 and having a plate 35 slidably mounted therein and adapted to extend through the plate 22 substantially to close the port 32 as shown in dotted lines as shown in Fig. 3 of the drawings, or to obstruct any desired portion thereof. The plate 35 is secured by means of a pin 36 to a slider 37 that extends through the block 34 and may be locked in any desired position by means of a set screw 38. Through the use of the slider 37, the plate 35 may be brought and held in any desired position.

The baffle 27 comprises a ring-like member 39 extending downwardly from the upper plate 22 to a position somewhat spaced from the lower plate 23. The baffle 28, similarly, comprises a ring-like member 41 extending upwardly from the lower plate 23 to a position somewhat spaced from the upper plate 22. The cooling air coming into the distributor ring 16 from the conduit 19 through the conduit 21 will flow through the ports 32, then under the baffle 27 and over the baffle 28 as shown by the arrows in Fig. 1 of the drawings.

The final distribution of the cooling air is effected by means of the baffle 29 which comprises a series of interfitting blocks 42 that are slideably mounted against the outer periphery of a ring-like member 43 that extends downwardly from the inner periphery of the upper plate 22 to a position spaced from the lower plate 23. Each of the blocks 42 is fastened by means of a pin 44 to the lower end of a stud 45 which extends through the upper plate 22 and has a nut 46 in threaded engagement with its upper end. A helical spring 47 positioned in a recess in the block 42 and under compression between the upper plate 22 and the block 42 urges said block downwardly. To adjust the block 42 to any desired position, the nut 46 is rotated thereby raising or lowering the stud 45. The inner end 48 of the lower plate 23 is inclined upwardly toward the center of the distributor ring 16 and forms with the similarly inclined lower end 49 of the blocks 42 a passageway 51 through which the cooling air emerges to strike the extruded tubing 12 as shown in Fig. 1 of the drawings. The air emerging from the passageway 51 has a component directed along the line of movement of the extruded tubing 12 as well as radially towards the periphery of said tubing.

Through suitable setting of the adjustable gates 33 and the blocks 42 it is possible to control the flow of cooling air closely so that any desired amount of air can be directed against any portion of the extruded tubing 12. In addition, each of the chambers formed by the strip 24 and the baffle 26, the baffle 26 and the baffle 27, the baffle 27 and the baffle 28, and the baffle 28 and the baffle 29, which chambers are relatively large compared to the rate of flow of the cooling air, acts like a pressure reservoir to equalize the pressure throughout its entire volume and thereby to make more uniform the radial distribution of the cooling air. Through the use of the distributor ring 16, it is accordingly possible to obtain an extruded tubing 12 or other extruded materials of cylindrical or other cross-section of uniform or non-uniform properties, as desired.

It is to be understood that the foregoing detailed description is given merely by way of illustration and that many variations may be made therein without departing from the spirit of our invention.

Having described our invention what we desire to secure by Letters Patent is:

1. A distributor ring comprising an annular chamber through the center of which an extruded article moves as it emerges from an extruder, means for introducing a fluid into said annular chamber, a stationary baffle positioned in said annular chamber, said baffle being provided with adjustable means comprising a plurality of interfitting blocks to regulate the flow of fluid past said baffle before it leaves the annular chamber and strikes the extruded article.

2. A distributor ring comprising an annular chamber through the center of which an extruded article moves as it emerges from an extruder, said annular chamber being provided with an opening, means for introducing a fluid into said annular chamber through said opening, and a series of annular baffles positioned in said annular chamber and dividing said annular chamber into a series of smaller annular chambers which are constructed so that distance between the baffles is at least 4 times the width of the opening at the outermost baffle to said smaller chambers whereby the smaller chambers will function as pressure reservoirs, at least one of the baffles having adjustment means to regulate the flow of fluid past said baffle.

3. A distributor ring comprising an annular chamber through the center of which an extruded article moves as it emerges from an extruder, said annular chamber being provided with an opening, means for introducing a fluid into said annular chamber through said opening, and a series of annular baffles positioned in said annular chamber and arranged to extend alternately upwardly from the base of the annular chamber and downwardly from the top of the annular chamber whereby the fluid will flow alternately over and under said baffles, the innermost and outermost of said baffles being provided with adjustable means around their periphery to regulate the flow of fluid past said baffles, said baffles dividing said annular chamber into a series of smaller chambers which are constructed so that the distance between the baffles is at least 4 times the width of the opening at the outermost baffle to said smaller chambers whereby the smaller chambers will function as pressure reservoirs.

4. A distributor ring comprising an annular chamber through the center of which an extruded article moves as it emerges from an extruder, means for introducing a fluid into said annular chamber, and a series of baffles positioned in said annular chamber, the innermost of said baffles comprising a plurality of interfitting blocks that are relatively adjustable one to the other to regulate the flow of fluid past said baffle before it leaves the annular chamber and strikes the extruded article.

5. A distributor ring comprising an annular chamber through the center of which an extruded articles moves as it emerges from an extruder, means for introducing a fluid into said annular chamber, and a series of baffles positioned in said annular chamber and arranged to extend alternately upwardly from the base of the annular chamber and downwardly from the top of the annular chamber whereby the fluid will flow alternately over and under said baffles, the innermost of said baffles comprising a plurality of interfitting blocks that are relatively adjustable one to the other to regulate the flow of fluid past said baffle before it leaves the annular chamber and strikes the extruded article.

6. A distributor ring comprising an upper annular plate, a lower annular plate spaced from said upper annular plate and a strip extending between said annular plates around the outer periphery of said annular plates and forming with said annular plates an annular chamber through the center of which an extruded article moves as it emerges from an extruder, means for introducing a fluid into said annular chamber, and a series of ring-like concentric baffles positioned in said annular chamber, the outermost of said baffles being provided with adjustable gates around its periphery to regulate the flow of fluid past said baffle.

7. A distributor ring comprising an upper annular plate, a lower annular plate spaced from said upper annular plate and a strip extending between said annular plates around the outer periphery of said annular plates and forming with said annular plates an annular chamber through the center of which an extruder article moves as it emerges from an extruder, means for introducing a fluid into said annular chamber, and a series of ring-like concentric baffles positioned in said annular chamber, the outermost of said baffles being provided with adjustable gates around its periphery to regulate the flow of fluid past said baffle and the innermost of said baffles comprising a plurality of interfitting blocks that are relatively adjustable one to the other to regulate the flow of fluid past said baffle before it leaves the annular chamber and strikes the extruded article.

8. In combination with an extruder for the production of extruded articles, a distributor ring comprising an upper annular plate a lower annular plate spaced from said upper annular plate and a strip extending between said annular plates around the outer periphery of said annular plates and forming with said annular plates an annular chamber through the center of which an extruded article moves as it emerges from the extruder, means for introducing a fluid into said annular chamber, and a series of ring-like concentric baffles positioned in said annular chamber, the outermost of said baffles being provided with adjustable gates around its periphery to regulate the flow of fluid past said baffle and the innermost of said baffles comprising a plurality of interfitting blocks that are relatively adjustable one to the other to regulate the flow of fluid past said baffle before it leaves the annular chamber and strikes the extruded article, and means adjustably supporting the distributor ring with respect to the extruder whereby the position at which the fluid strikes the extruded article may be varied.

References Cited in the file of this patent

UNITED STATES PATENTS

| | | |
|---|---|---|
| 1,989,340 | Shepherd | Jan. 29, 1935 |
| 2,047,554 | Fischer | July 14, 1936 |
| 2,528,200 | Weinberg | Oct. 31, 1950 |
| 2,583,330 | Eckert | Jan. 22, 1952 |
| 2,631,332 | Reber | Mar. 17, 1953 |
| 2,632,206 | Pierce | Mar. 24, 1953 |
| 2,668,323 | Johnson | Feb. 9, 1954 |
| 2,720,679 | Ratliff | Oct. 18, 1955 |
| 2,753,596 | Bailey | July 10, 1956 |

FOREIGN PATENTS

| | | |
|---|---|---|
| 501,468 | Great Britain | Feb. 28, 1939 |